US007664880B2

(12) United States Patent
Allen et al.

(10) Patent No.: US 7,664,880 B2
(45) Date of Patent: Feb. 16, 2010

(54) LIGHTWEIGHT ADDRESS FOR WIDELY-DISTRIBUTED ADHOC MULTICAST GROUPS

(75) Inventors: Nicholas Alexander Allen, Redmond, WA (US); Stephen Maine, Seattle, WA (US); Sergiy Kuryata, Redmond, WA (US); Mark Prentice, Woodinville, WA (US); Roman Batoukov, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 234 days.

(21) Appl. No.: 11/839,403

(22) Filed: Aug. 15, 2007

(65) Prior Publication Data

US 2009/0049197 A1 Feb. 19, 2009

(51) Int. Cl.
*G06F 15/16* (2006.01)
*G06F 15/173* (2006.01)
*G06F 15/177* (2006.01)

(52) U.S. Cl. .................. 709/245; 370/328; 709/227; 709/206

(58) Field of Classification Search .......... 709/245, 709/203–206, 227–230; 370/328
See application file for complete search history.

(56) References Cited

U.S. PATENT DOCUMENTS

| 5,361,256 | A | 11/1994 | Doeringer et al. |
| 6,181,697 | B1 | 1/2001 | Nurenberg et al. |
| 6,625,773 | B1 | 9/2003 | Boivie et al. |
| 6,798,773 | B2 | 9/2004 | Trossen et al. |
| 7,016,351 | B1 | 3/2006 | Farinacci et al. |
| 7,152,110 | B2 * | 12/2006 | Pierce ................ 709/227 |
| 2001/0056496 | A1 * | 12/2001 | Tam .................... 709/230 |
| 2002/0143951 | A1 | 10/2002 | Khan et al. |
| 2004/0202120 | A1 * | 10/2004 | Hanson ............... 370/328 |
| 2004/0267876 | A1 * | 12/2004 | Kakivaya et al. ...... 709/200 |

FOREIGN PATENT DOCUMENTS

| WO | 03039076 A1 | 5/2003 |
| WO | 2005064831 A1 | 7/2005 |

(Continued)

OTHER PUBLICATIONS

Ballardie, Tony, et al, "Core Based Trees (CBT): An Architecture for Scalable Inter-Domain Multicast Routing," http://www.cs.berkeley.edu/~kwei/readings/multicast/summaries/CBT.doc, Oct. 1993, ACM Press, USA, p. 1.

(Continued)

*Primary Examiner*—Haresh N Patel
(74) *Attorney, Agent, or Firm*—Senniger Powers LLP

(57) ABSTRACT

Delivery of a message over a communications network from a sender based on a single delivery address. The single delivery address is generated as one unit for the message. The single delivery address has a collection of recipient addresses including one or more recipient addresses each identifying at least one recipient of the message. Each of the one or more recipient addresses includes a user level information and a domain level information. The generated single delivery address with the collection of recipient addresses is included in the message. A copy of the message is provided to the identified recipient(s) as a function of the domain level information of the one or more recipient addresses. The message is transmitted over the communications network to the identified recipient(s) recipient based on the collection of recipient addresses.

20 Claims, 5 Drawing Sheets

FOREIGN PATENT DOCUMENTS

WO          2005114431 A3    12/2005

OTHER PUBLICATIONS

Deering, Stephen, et al., "An Architecture for Wide-Area Multicast Routing," http://delivery.acm.org/10.1145/200000/190326/p126-deering.pdf?key1=190326&key2=7789999711&coll=GUIDE&dl=GUIDE&CFID=23453163&CFTOKEN=72462820, 1994, ACM Press, USA, Dec. 31 p. 1.

Deering, Stephen, et al., "Multicast Routing in Datagram Internetworks and Extended LANs," ACM Transactions on Computer Systems, vol. 8, No. 2, May 1990, pp. 85-110, ACM Press, USA.

* cited by examiner

PRIOR ART

LIGHTWEIGHT ADDRESS FOR WIDELY-DISTRIBUTED ADHOC MULTICAST GROUPS

BACKGROUND

In computer networks, message delivery and routing capabilities depend heavily on the concept of network addresses to identify the intended recipient(s) of a given message. One type of network address is a unicast address which identifies exactly one recipient as the destination of the message. For example, the following numerical representation under the Internet Protocol version 4 User Datagram Protocol (IPv4 UDP) identifies a unique address: 1.2.3.4:1234. Similarly, a commonly known domain-qualified electronic mail (e-mail) address may be: person@a.com.

The other type of network address is a multiple broadcast or multicast address which identifies a group of recipients who collectively form the destination(s) for the message(s). For example, a typical multicast address is a single address that targets multiple receivers: Numerical (e.g. IPv4 UDP) 232.1.2.3:1234 or domain-qualified (e.g. Mail) delivery-group@a.com.

Many addressing schemes exist today for multicast delivery, for example, the IPv4 UDP multicast scheme. However, current solutions today suffer from a variety of problems including scale limitations. For example, current multicast mechanisms typically cannot operate over extremely wide-area networks (e.g. the Internet). IPv4 UDP multicast, for example, is limited to the local subnet unless there is a global coordination of servers to perform the routing. Also, another drawback of the current implementation is the requirement for a centralized coordination. For example, existing multicast addressing schemes typically rely on a single centralized point of coordination to manage the set of nodes participating in a multicast delivery group. A federation of delivery groups, such as sending messages to sets of delivery groups managed by different nodes, is not supported.

Furthermore, existing practices may fail to ensure or guarantee address uniqueness. For example, current multicast addressing schemes that do not rely on a central coordination point are typically vulnerable to address collision, such as assigning the same address to two separate and non-equivalent nodes. There is also the issue of a finite upper bound on size of multicast address space. The existing IPv4 UDP multicast scheme uses an address space of 28 bits which limits the maximum number of simultaneous multicast groups to $2^{28}$ groups. The upper bound on the number of nodes within a UDP multicast group is limited to the size of the subnet.

SUMMARY

Embodiments of the invention overcome and address one or more of these problems by introducing the notion of a multicast list address, which is a single address as one unit composed of a set (one or more) of sub-addresses. The multicast list address is then encoded inside a unicast address to provide a normalized programming model. Aspects of the invention also enable expansion of the list address during network operations such that the expansion may remain transparent to the application and network transport as necessary.

Alternative embodiments further include elements of a list address which may be unicast addresses, multicast addresses, or themselves multicast list addresses. Each element within a multicast list address can be managed independently by different hosts, enabling federated management of multicast delivery groups and eliminating the requirement for a centralized management point. Also, alternative aspects of the invention resolve address uniqueness issue within a multicast list address by having the individual sub-addresses within the list to be unique. Aspects of the invention also overcome the limitations of the current practices of imposing a fixed upper bound on the number of recipients targeted by a multicast list address or a fixed upper bound on the maximum number of list addresses themselves.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Embodiments of the invention relieve the number of copies of messages transmitted in a communications network and between the sender and the recipients by using a single delivery address. The single delivery address enables a format that, if the intermediate routing devices in the network can interpret it, reduces the number of unnecessary copies of a message delivered to a recipient. Aspects of the invention enable the ability to encode a multicast list address into a unicast-like or a single delivery address as one unit for processing by unicast systems and delegate management of individual elements within a multicast list address to separate hosts, thereby eliminating the requirement for a centralized management point. In addition, alternative embodiments of the invention enable transparent processing of multicast list addresses to both the application programming model and to network transports.

Figure 1:
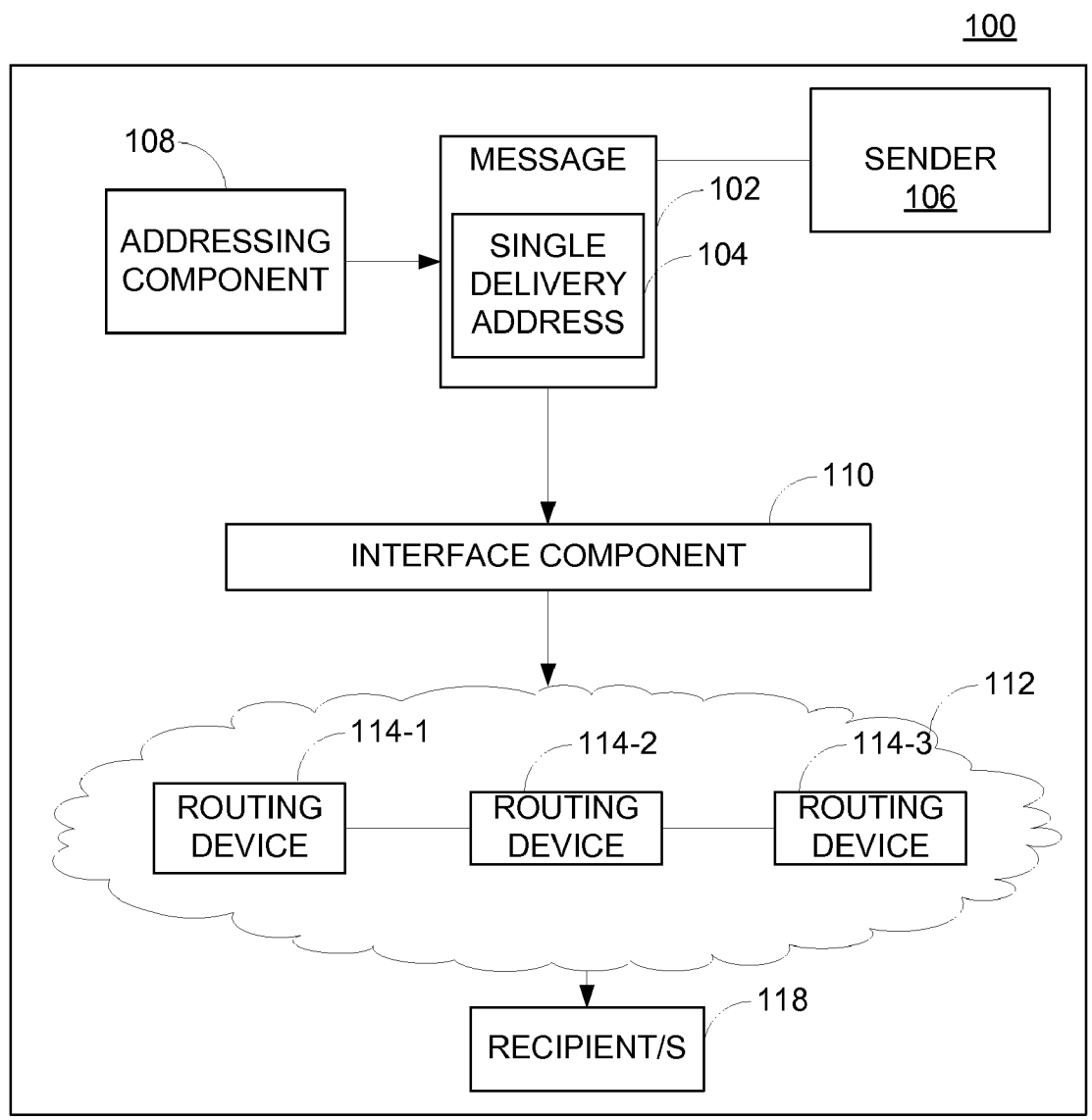
FIG. 1 is an exemplary embodiment of a system for delivering a message from a sender over a communications network according to an embodiment of the invention.

FIG. 1 illustrates a diagram showing a system 100 for delivering a message from a sender over a communications network according to an embodiment of the invention. In one embodiment, the system 100 includes a system of computing devices, computers, computer servers, computer clients (not shown), or the like. The system 100 also includes a communications network 112 for enabling communications between the devices within the system 100. For example, the communications network 112 may be an intranet, an internet, a local area network (LAN), a wide area network (WAN), or the like. In another example, the transmission of messages within the communications network 112 may be wireless or wired.

The system 100 also includes a message 102 for delivery from a sender 106 to one or more recipients 118 depending on the number of recipient addresses. For example, the message 102 may be a datagram message or an electronic mail (e-mail) message. As described above in the background section, the message 102 may be sent to the recipient 118 via either unicast addressing or multicast addressing. In other words, the delivered message 102 is either delivered to one recipient (i.e., unicast) or two or more recipients (i.e., multicast). In multicast delivery, a copy of the same message is delivered to each recipient. Such multicast delivery is known in the prior art and existing addressing schemes support only a single target address and do not have the concept of a list address. Furthermore, the expectation for many addressing schemes is that the target address is unicast.

Figure 2:
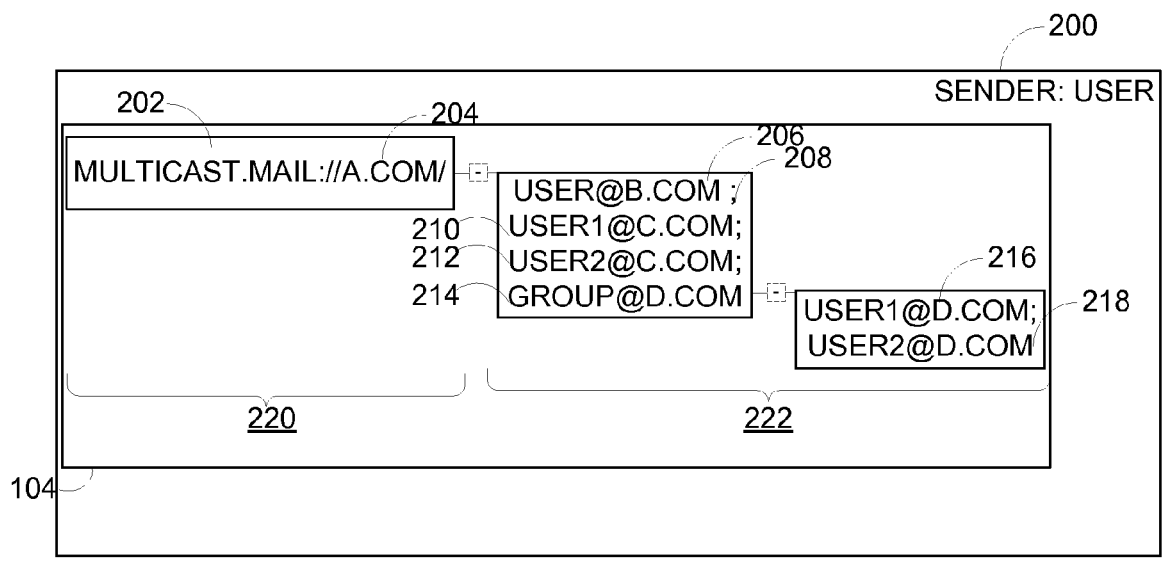
FIG. 2 is a block diagram illustrating a data structure of a message with a single delivery address according to an embodiment of the invention.

Embodiments of the invention create a single delivery address 104 with or encoded with a list address. For example, FIG. 2 is a diagram illustrating a data structure of a message with the single delivery address 104 according to an embodiment of the invention. FIG. 2 illustrates a first data field 220 and a second data field 222. The first data field 220 includes addressing information of a sender "USER" from a domain "A.COM" that is attempting to send a message 200 to four addresses: user@b.com; user1@c.com; user2@c.com; and group@d.com, which are included in the second data field 222. The single delivery address 104 includes a scheme information 202 and a host information 204 for encoding the single delivery address 104. In the illustrated example, the single delivery address 104 includes "multicast.mail://" as the scheme information and "a.com" as the host information 204. In an alternative embodiment, the scheme information 202 relies on the uniform resource identifier (URI) format for composing the scheme information 202 and the single delivery address 104. For example, a generic URI syntax format may consist of a hierarchical sequence of components referred to as the scheme, authority, path, query, and fragment, such as below:

URI=scheme ":" hier-part ["7" query] ["#" fragment]
hier-part="//" authority path- (maybe empty)
/ path-absolute
/ path-rootless
/ path-empty In this generic URI format syntax, the scheme and path components are required, though the path may be empty (no characters). When authority is present, the path must either be empty or begin with a slash ("/") character. When authority is not present, the path cannot begin with two slash characters ("//"). These restrictions result in five different augmented Backus-Naur form (ABNF) rules for a path, only one of which will match any given URI reference.

In addition, the following are two example URIs and their component parts:

```
foo://example.com:8042/over/there?name=ferret#nose

\_/   _____/_____/ _____/ \__/
 |           |             |           |        |
scheme   authority        path       query  fragment
 |    _____|__
     /                         \
    /\   /                      \ urn:example:animal:ferret:nose
Other URI format examples include:
ftp://ftp.is.co.za/rfc/rfc1808.txt
```

-continued

```
http://www.ietf.org/rfc/rfc2396.txt
ldap://[2001:db8::7]/c=GB?objectClass?one
mailto:John.Doe@example.com
news:comp.infosystems.www.servers.unix
tel:+1-816-555-1212
telnet://192.0.2.16:80/
urn:oasis:names:specification:docbook:dtd:xml:4.1.2
```

It is to be understood that other format or scheme may be used without departing from the scope of the invention. For example, the single delivery address 104 may be encoded as part of a message using a Simple Object Access Protocol (SOAP).

The host information 204 indicates the host name of the sender (i.e., USER). For example, as this message 200 is an e-mail message, the USER is sending the message 200 from USER@a.com. In one embodiment, the scheme information 202 and the host information 204 establish a hierarchical portion of the message 200 that is of the similar syntax and semantics as the current message delivery format. In the second data field 222, a non-hierarchical portion of the single delivery address 104 corresponds to a collection of one or more recipient addresses, such as user@b.com 206; user1@c.com 210; user2@c.com 212; and group@d.com 214, each identifying at least one recipient of the message. Each of the recipient addresses in the second data field 222 includes a user level information (i.e., user or user1) and a domain level information (i.e., b.com or c.com). Each of the addresses is delimited or separated by a delimiter 208.

In one example, the domain level information or the host information 204 provides a host information or a path information to a sender or a recipient. It is also to be understood that the domain level information or the host information 204 may include directory information, Internet Protocol address conventions, or connectivity to a specific communications network or other means that identifies a path to the recipient, either an individual or a group, or the sender in a federation of computing devices and/or computer networks. Similarly, the domain level information or the domain information 104 may also include group information in such federation of computing devices and/or computer networks that define group boundaries based on proprietary or nonproprietary directory information, Internet Protocol address conventions, or connectivity to a specific communications network.

In one embodiment, the user level information and/or the domain level information may be omitted from the host information 104 and the one or more recipient addresses in the second data field 222. For example, the omitted user level information or the domain level information may be transmitted implicitly or explicitly through another mechanism.

Figure 3A:
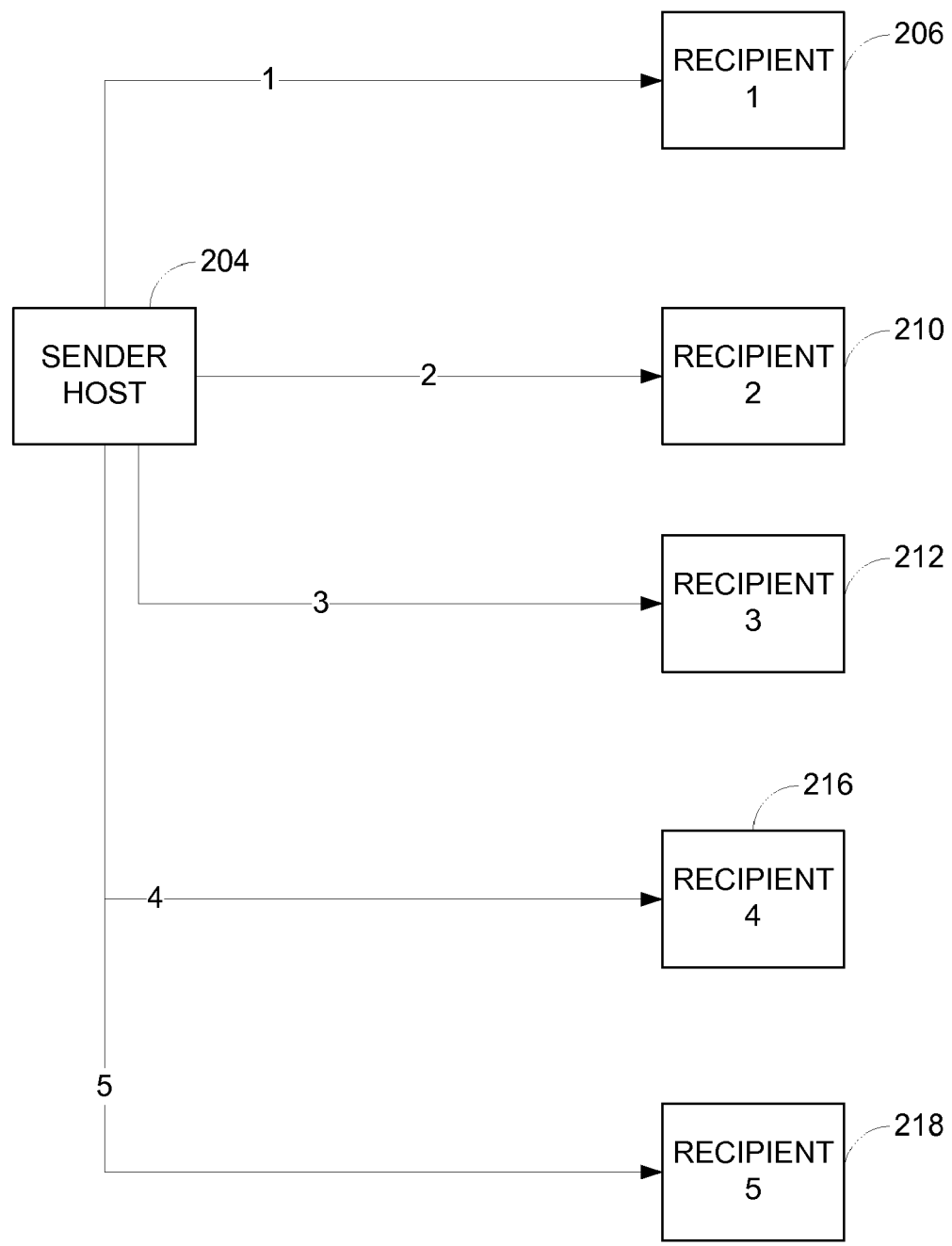
FIG. 3A is a block diagram illustrating an existing address delivery scheme of a multicast message.
Figure 3B:
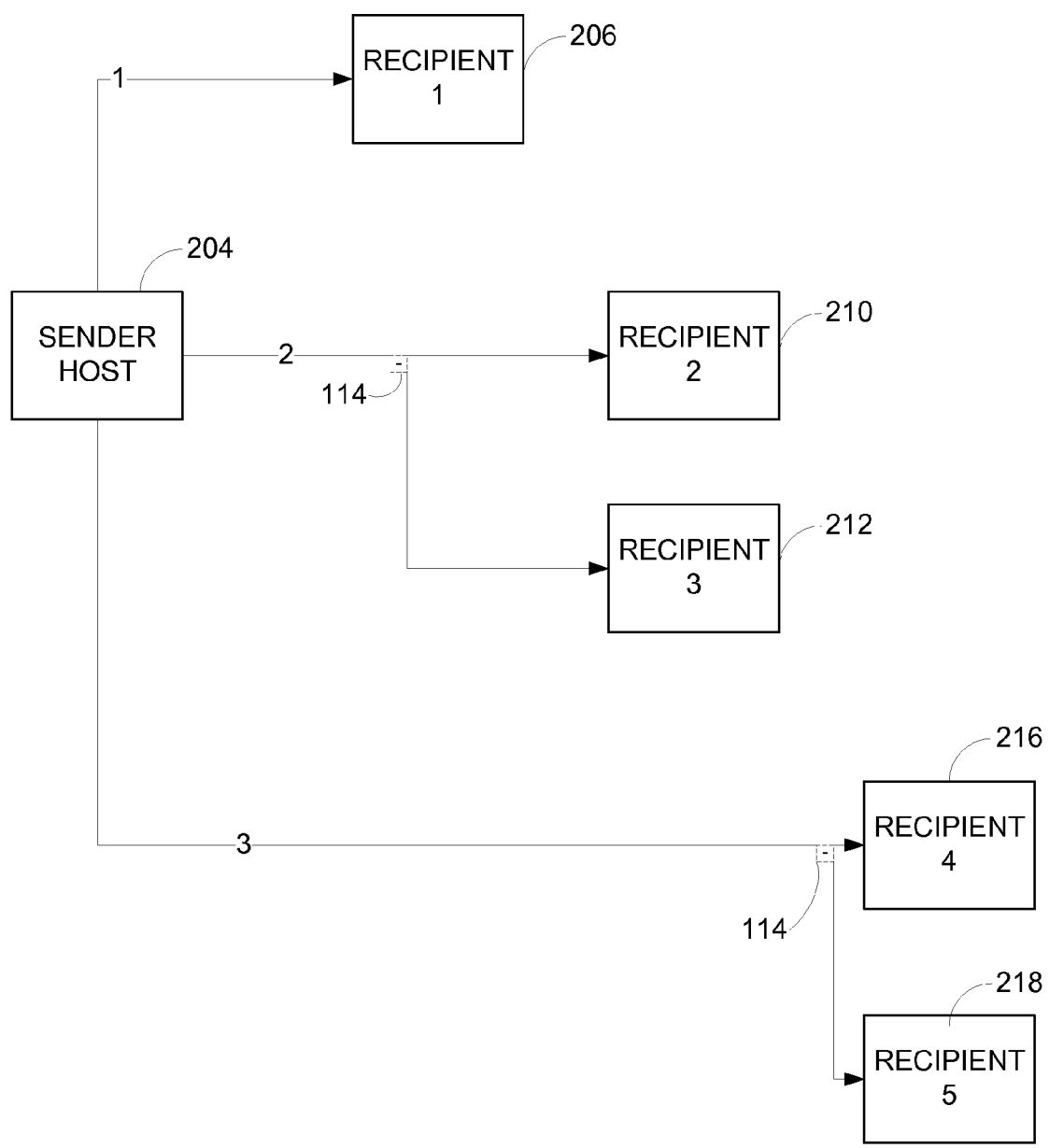
FIG. 3B is an exemplary block diagram illustrating expansion of delivery of a message according to an embodiment of the invention.

Referring now to FIG. 3B a diagram illustrates expansion of delivery of a message according to an embodiment of the invention. In one example, FIG. 3B uses the message 200 and the single delivery address 104 illustrated in FIG. 2 in showing the advantages and efficiency of embodiments of the invention.

Under the prior art technologies and addressing schemes as shown in FIG. 3A, five (5) copies of the message 200 will be transmitted across the network 112 in delivering the message to the intended recipients 206, 210, 212, 216 and 218. The recipients 216 and 218 are members of the multicast address 214, "GROUP@D.COM." At least one difference between the multicast address and the single delivery address is the ability to reduce the number of copies of the message being transmitted before the domain level.

To further illustrate advantages of embodiments of the invention, FIG. 3A illustrates an existing addressing scheme, and FIG. 3B illustrates one exemplary embodiment of the invention to demonstrate at least one advantage over the existing technology.

In FIG. 3A, the sender 204 attempts to send the message 102 to the recipients 206, 210, 212, 216 and 218. In doing so, the existing addressing scheme makes five (5) copies of the message 200 when sending the message to each of the recipients. These five copies of the messages (denoted by the numbered arrows) are bound to be delivered to each destination. As such, even though the recipient 2 (i.e., user1@c.com) 210 and the recipient 3 (i.e., user2@c.com) 212 are two user accounts within the same domain (i.e., c.com), the existing addressing scheme automatically makes two (2) copies of the message from the sender 204 to the recipients. In addition, each copy of the message 200 is also generated for each member of the multicast address 214 (i.e., group d.com).

On the other hand, embodiments of the invention only require that copies of the message be generated as a function of the one or more recipient addresses. For example, the copies of the messages may be generated based on the domain level when delivering the message to the recipients so as to reduce the number of messages, as illustrated FIG. 3B. Similar to FIG. 3A, the sender 204 wishes to send the message 200 to the recipient 1 (i.e., user b.com) 206, and a copy of the message 200 (denoted by the number "1" in the delivery path) is generated in FIG. 3B. This is due to the fact that the address for recipient 1 identifies one user (i.e., user) in the domain b.com. Another copy of the message 200 (denoted by the number "2" in the delivery path) is generated when delivery to a routing device 114. The routing device 114 may be a router or a server for a particular domain host. In this example, the routing device 114 handles inbound messages for the domain c.com. Consequently, embodiments of the invention enable routing devices 114 or servers along the delivery path to recipients to expand the single delivery address and to identify that recipient 2 210 and recipient 3 212 are within the same domain level, (i.e., c.com). As such, only one copy of the message 200, instead of two (2) copies of the message as show in FIG. 3A, is transmitted to the routing device 114 before being delivered to recipients 2 and 3.

Similarly, another copy of the message 200 (denoted by the number "3" in the delivery path) is generated for another routing device 114-N. In this instance, this copy is generated due to the fact that the recipient's domain level information (i.e., d.com) is not identical to the domain level information of recipient 1 206 (user b.com) or recipient 2 210 (user1@c.com). In addition, even though it is later determined that the user level information of the address 214 (i.e., group) is a multicast address within the domain "d.com", embodiments of the invention would only generate one copy of the message during transmission from the sender host 204 to the routing device 104-3 which handles messages for the domain "d.com". The routing device 104-3, based on information about users within the domain d.com, would separately generate a copy of the message for each member (i.e., recipient 4 and recipient 5) of the address 214.

In one alternative embodiment, the next-hop address for each delivery may be an intermediate server with routing capability. At each hop of the routing path, the encoded multicast list is exploded out to branch where the routing paths diverge.

In a further embodiment of the invention, the comparison of the domain level information may cause generation of copies of the message 102 when the domain level information is not an exact match among the recipient addresses. For example, the comparisons may be based on equivalence rather than an exact match. Using a simplistic e-mail address as an example, suppose there is a recipient user1@a.example.com and a recipient user2@b.example.com. There are three federations being described: a.example.com, b.example.com, and example.com. One routing device may be configured to treat a.example.com and b.example.com as equivalent because they both belong to the larger federation example.com. Another routing device may be configured to treat a.example.com and b.example.com as not equivalent. As such, when the domain level information is provided, copies of the message 102 are generated as a function of the domain level information of the recipient addresses.

Unlike the existing addressing scheme in FIG. 3A, five (5) copies of the messages are generated as soon as the message leaves the sender host 204.

It is to be understood that while the message transport mechanism of Simple Mail Transfer Protocol (SMTP) mail has been used throughout this example, other network transports may be used without departing from the scope of the invention. Changing the network transport requires picking a new scheme name but does not otherwise alter any application behavior. Aspects of the invention enable address expansion which is transparent to the application. When using a preexisting network transport, address expansion can be made transparent to the transport as well by having the expansion take place in an intermediate processing layer.

In addition, embodiments of the invention guarantee the uniqueness of a domain-qualified multicast address in the same way as a domain-qualified unicast address. Transports and delivery mechanisms are able to treat a domain-qualified multicast address as if it were a simple unicast address. However, the owner of the a.com registry is free to consider the delivery-group identifier as an alias for multiple recipient addresses (e.g. a message addressed to delivery-group@a.com might be forwarded internally to user1@a.com and user2@a.com unbeknownst to the original sender).

Furthermore, the single delivery address 104 includes a list of address in an unordered sequence of unicast and multicast addresses, such as (IPv4 UDP) 1.2.3.4:1234; 1.2.3.4:5678; 232.1.2.3:1234, or person@a.com; person@b.com; delivery-group@a.com, or as shown in FIG. 2.

Alternative embodiments of the invention also introduce the concept of a multicast list address to eliminate both the need to have a prearranged multicast group and the one-delivery-group-per-message limitation of today's multicast.

In the embodiment where the user level information and/or the domain level information may be omitted from the host information 104 and/or the one or more recipient addresses, the omitted user level information or the domain level information may be transmitted implicitly or explicitly through another mechanism before a copy of the message is generated.

In a further alternative embodiment of the invention, one copy of the message is transmitted using a communications network that allows the one copy of the message to be simultaneously viewed by multiple recipients. Another alternative implementation of the invention includes transmitting one copy of the message to a storage location from which multiple recipients can later retrieve the message. A combination of the alternative embodiments may be implemented simultaneously or substantially simultaneously. For example, a heterogeneous collection of recipients that includes both unicast and multicast addresses may employ different transmission mechanisms for the unicast addresses than for the multicast addresses.

Figure 4:
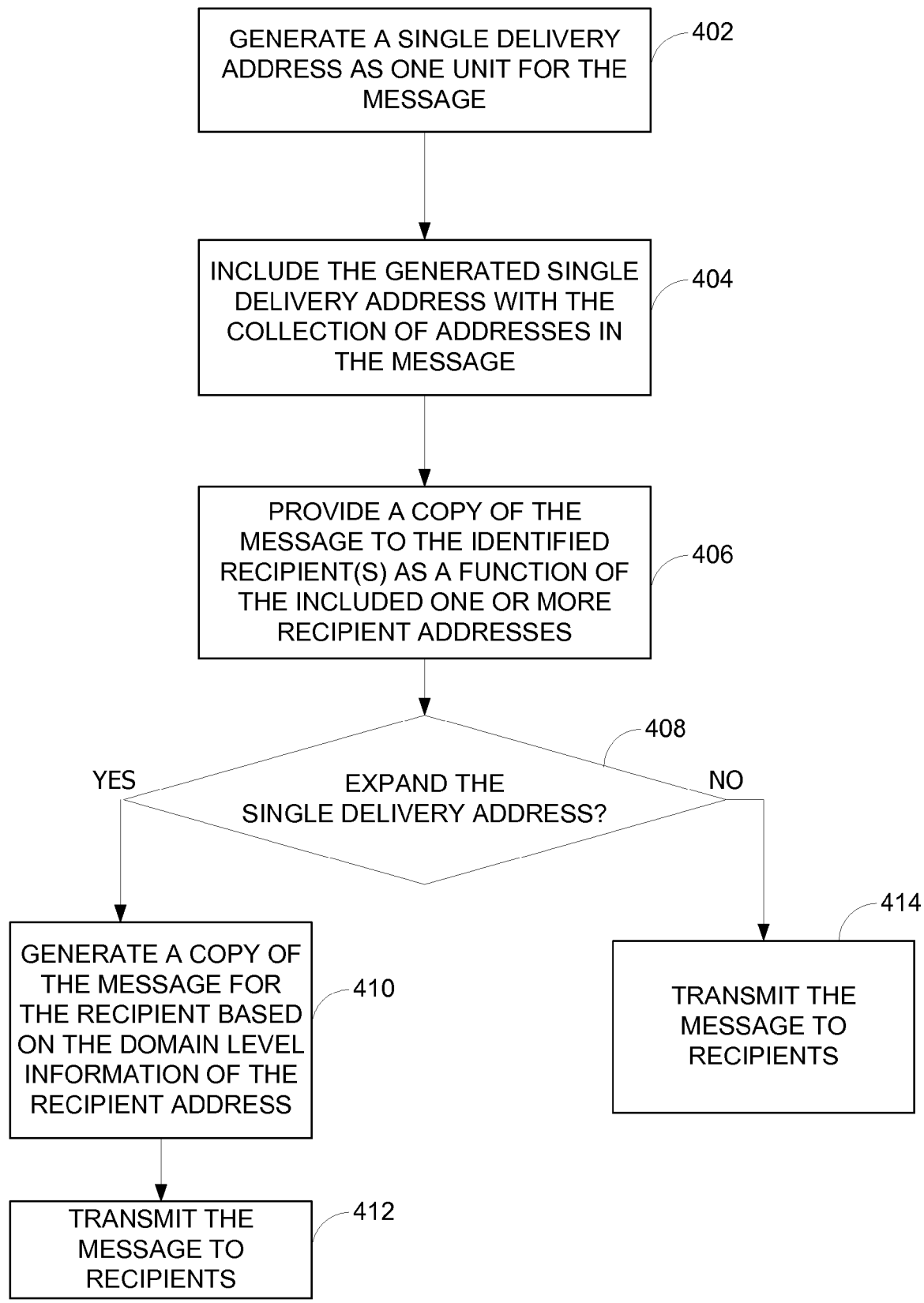
FIG. 4 is an exemplary flow chart illustrating operation delivery of a message using a single delivery address according to an embodiment of the invention.

Referring now to FIG. 4, a flow diagram illustrating operations of delivering of a message from a sender using a single delivery address according to an embodiment of the invention. At 402, a single delivery address is generated as one unit for the message. The single delivery address has a collection of recipient addresses including one or more recipient addresses each identifying at least one recipient of the message. Each of the one or more recipient addresses includes a user level information and a domain level information. The generated single delivery address with the collection of recipient addresses is included in the message (e.g., message 200) at 404. At 406, copies of the message are provided over the communications network to the identified recipient(s) based on the collection of recipient addresses. In one embodiment, at 408, it is determined whether to expand the single delivery address. For example, for routing devices or servers that can interpret the scheme of the single delivery address, the routing devices or servers may interpret and identify the single delivery address 104 and the collection of the single delivery address 104 (i.e., the first data field 220 and the second data field 222). At 410, if the determination is positive, a copy of the message for the identified recipient(s) is generated as a function of the domain level information of the one or more addresses. At 412, the copies of the messages are delivered to the recipients. On the other hand, if the determination is negative, the copies of the message are delivered to the recipients based on the known delivery scheme.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for delivery of a message over a communications network from a sender, said method comprising:
    generating a message having a collection of recipient addresses including two or more recipient addresses each identifying at least one recipient of the message under different domains with domain information associated therewith, said different domains having mail handling servers associated therewith, each of the recipient addresses having a domain associated therewith;
    generating a single delivery address as one unit for the message, said single delivery address representing the collection of recipient addresses;
    encoding the generated single delivery address with the collection of recipient addresses in the message;
    transmitting a single copy of the message including the encoded single delivery address to each of the mail handling servers for each of the different domains;
    in response to each particular mail handling server receiving the single copy of the message:
        expanding by each particular mail handling server the collection of the recipient addresses from the encoded single delivery address;
        generating by each particular mail handling server a copy of the message for each identified recipient(s) of the associated domain; and
        transmitting by each particular mail handling server the generated copies of the message over the communications network to the identified recipient(s).

2. The method of claim 1, wherein each of the two or more recipient addresses includes a user level information and a domain level information, and wherein generating the copy of the message comprises generating the copy of the message for the identified recipient(s) as a function of the domain level information of the two or more recipient addresses.

3. The method of claim 1, wherein generating the single delivery address comprises generating the single delivery address having a scheme name and a host name, wherein the scheme name comprises a uniform resource identifier (URI) format and wherein the host name comprises the host information of the sender.

4. The method of claim 1, wherein generating the copy comprises at least one or more of the following: generating the copy of the message for the identified recipient(s) as a function of the included two or more recipient addresses, transmitting one copy of the message using the communications network that allows the one copy of the message to be simultaneously viewed by the one or more recipients, and transmitting one copy of the message to a storage location from which the one or more recipients can later retrieve the one copy of the message.

5. The method of claim 1, wherein generating the single delivery address comprises generating the single delivery address including at least one of the following type of addresses: a set of unicast addresses, a set of multicast addresses, and a collection of a set of unicast addresses and a set of multicast addresses.

6. The method of claim 1, wherein transmitting comprises transmitting the message via one or more routing devices in the communications network, and further comprising expanding the collection of recipient addresses at the one or more routing devices for delivery of the message.

7. The method of claim 6, wherein expanding comprises generating a copy of the message for the recipient based on the domain information of the recipient address.

8. One or more computer readable storage media having a data structure stored thereon for delivery of a message over a communications network from a sender, said data structure comprising:
- a first data field including data identifying addressing information of the sender of the message; and
- a second data field including data identifying a single delivery address, said single delivery address representing a collection of recipient addresses including two or more recipient addresses each identifying at least one recipient of the message under different domains with domain information associated therewith, said different domains having mail handling servers associated therewith, each of the recipient addresses having a domain associated therewith,
- wherein the first data field and the second data field indicate a provision of a copy of the message to each of the mail handling servers for each of the different domains; and
- wherein, in response to receiving the single copy of the message by each of the mail handling servers, the single delivery address in the second data field is expanded to indicate the represented collection of recipient addresses, a copy of the message for each identified recipient according to the second data field is generated, and wherein the generated copies of the message are transmitted over the communications network to the identified recipient (s).

9. The computer-readable storage media of claim 8, wherein each of the two or more recipient addresses includes a user level information and a domain level information, and wherein the first data field and the second data field indicate the provision of the copy of the message as a function of the domain level information of the two or more recipient addresses.

10. The computer-readable storage media of claim 8, wherein the first data field identifies one or more of the following: a scheme name for the formatting scheme of information of the first data field and the second data field, and a host information of the sender, and wherein the first data field and the second data field comprise a uniform resource identifier (URI) format.

11. The computer-readable storage media of claim 8, wherein the first data field and the second data field indicate at least one or more of the following: a generation of the copy of the message for the identified recipient(s) as a function of the included two or more recipient addresses, a transmission of one copy of the message using the communications network that allows the one copy of the message to be simultaneously viewed by the one or more recipients, and a transmission of one copy of the message to a storage location from which the one or more recipients can later retrieve the one copy of the message.

12. The computer-readable storage media of claim 8, wherein the single delivery address of the second data field comprises at least one of the following types of addresses: a set of unicast addresses, a set of multicast addresses, and a collection of a set of unicast addresses and a set of multicast addresses.

13. The computer-readable storage media of claim 8, wherein the single delivery address comprises information indicating expansion of the collection of recipient addresses at one or more routing devices for delivery of the message.

14. The computer-readable storage media of claim 13, wherein the information indicating the expansion of the collection of recipient addresses of the single delivery address comprises information for generating a copy of the message for the recipients based on the domain information of the recipient address.

15. A system for delivery of a message over a communications network from a sender, said system comprising:
- addressing component for generating a single delivery address as one unit for the message, said single delivery address having a collection of recipient addresses including two or more recipient addresses each identifying at least one recipient of the message under different domains, each of the different domains having a routing device associated therewith, wherein the addressing component encodes the generated single delivery address with the collection of recipient addresses in the message before transmission, each of the recipient addresses having a domain associated therewith;
- interface component for transmitting a single copy of the message over the communications network from the sender based on the encoded single delivery address to each of the routing devices associated with each of the different domains; and
- in response to each of the one or more routing devices receiving the single copy of the message, wherein the one or more routing devices expands the collection of the recipient addresses from the encoded single delivery address and generates a copy of the message before delivering the generated copies of the message to the identified recipient(s);
- the addressing component and the interface component being hardware components of the system.

16. The system of claim 15, wherein each of the two or more recipient addresses includes a user level information and a domain level information, and wherein the one or more routing devices determines generation of the copy of the message for delivering the message to the identified recipient (s) based on the domain level information of the two or more recipient addresses.

17. The system of claim 15, wherein the addressing component is configured to generate the single delivery address having a scheme information and a host information, and wherein the scheme information comprises a uniform resource identifier (URI) format.

18. The system of claim 15, wherein the addressing component is configured to generate the single delivery address including at least one of the following type of addresses: a set of unicast addresses, a set of multicast addresses, and a collection of a set of unicast addresses and a set of multicast addresses.

19. The system of claim 15, wherein the one or more routing devices are configured to expand the collection of recipient addresses at the one or more routing devices for delivery of the message.

20. The system of claim 15, wherein the one or more routing devices are configured to generate a copy of the message for the recipient as a function of the domain level information of the two or more recipient addresses.

* * * * *